(12) United States Patent
Fukuyama

(10) Patent No.: US 8,279,299 B2
(45) Date of Patent: Oct. 2, 2012

(54) IMAGING DEVICE AND ASSOCIATED METHODOLOGY OF SETTING ADJUSTABLE ASPECT RATIOS

(75) Inventor: Takashi Fukuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 376 days.

(21) Appl. No.: 12/673,776

(22) PCT Filed: Aug. 26, 2008

(86) PCT No.: PCT/JP2008/065624
§ 371 (c)(1),
(2), (4) Date: Feb. 17, 2010

(87) PCT Pub. No.: WO2009/028703
PCT Pub. Date: Mar. 5, 2009

(65) Prior Publication Data
US 2011/0043650 A1 Feb. 24, 2011

(30) Foreign Application Priority Data
Aug. 27, 2007 (JP) .................................. 2007-220342

(51) Int. Cl.
*H04N 5/225* (2006.01)
(52) U.S. Cl. ............ 348/220.1; 348/240.99; 348/333.11
(58) Field of Classification Search ............. 348/207.99, 348/220.1, 222.1, 240.99, 294, 333.01, 333.03, 348/333.11
See application file for complete search history.

(56) References Cited

U.S. PATENT DOCUMENTS

| | | | |
|---|---|---|---|
| 2004/0201764 A1* | 10/2004 | Honda et al. | 348/333.01 |
| 2005/0046725 A1* | 3/2005 | Sasagawa | 348/333.01 |
| 2006/0132638 A1* | 6/2006 | Saitou | 348/333.01 |
| 2007/0058061 A1* | 3/2007 | Nakayama et al. | 348/294 |
| 2007/0147790 A1* | 6/2007 | Saitou et al. | 386/112 |
| 2007/0188622 A1* | 8/2007 | Yagi | 348/220.1 |
| 2010/0013950 A1* | 1/2010 | Kikuchi | 348/222.1 |

FOREIGN PATENT DOCUMENTS

| | | |
|---|---|---|
| JP | 2005 156995 | 6/2005 |
| JP | 2006 23383 | 1/2006 |
| JP | 2007 142908 | 6/2007 |
| JP | 2008 54072 | 3/2008 |

* cited by examiner

*Primary Examiner* — Nelson D. Hernández Hernández
*Assistant Examiner* — Dennis Hogue
(74) *Attorney, Agent, or Firm* — Oblon, Spivak, McClelland, Maier & Neustadt, L.L.P.

(57) ABSTRACT

According to the invention, extracting still and moving pictures having different aspect ratios from an original picture from within an extraction range suitable for an imaging mode can be performed. An embodiment of the invention, according to the selected imaging mode, sets the still picture extraction range with an aspect ratio of 4:3 for extracting a still picture and the moving picture extraction range with an aspect ratio of 16:9 for extracting an HD moving picture within the imaging range of the imaging device 17. Then, the embodiment, from the imaged picture, extracts a picture within the set still picture extraction range as still picture, and extracts a picture within the set moving picture extraction range as HD moving picture. That is, the embodiment can switch between the still picture extraction range and the HD moving picture extraction range having different aspect ratios according to the imaging mode. And thus, from the picture within the imaging range (i.e., the original picture), the embodiment can extract the still picture and the HD moving picture having different aspect ratios from within the extraction range suitable for the imaging mode.

6 Claims, 13 Drawing Sheets

[FIG. 1]
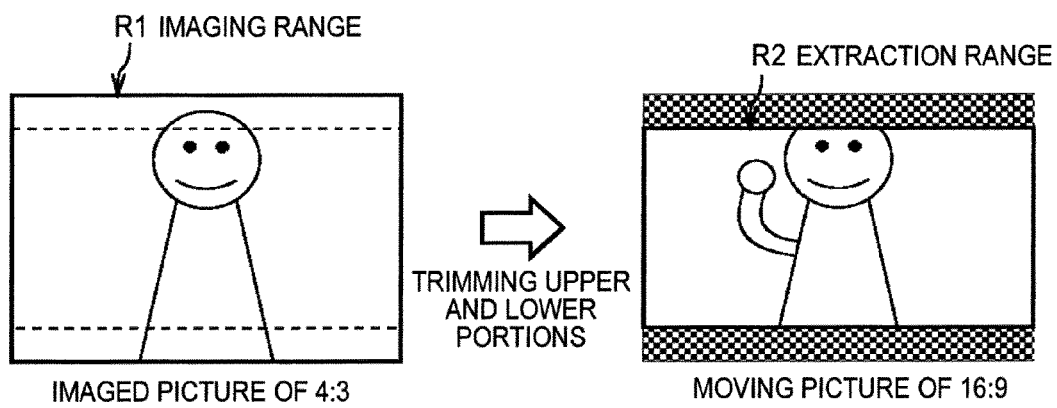

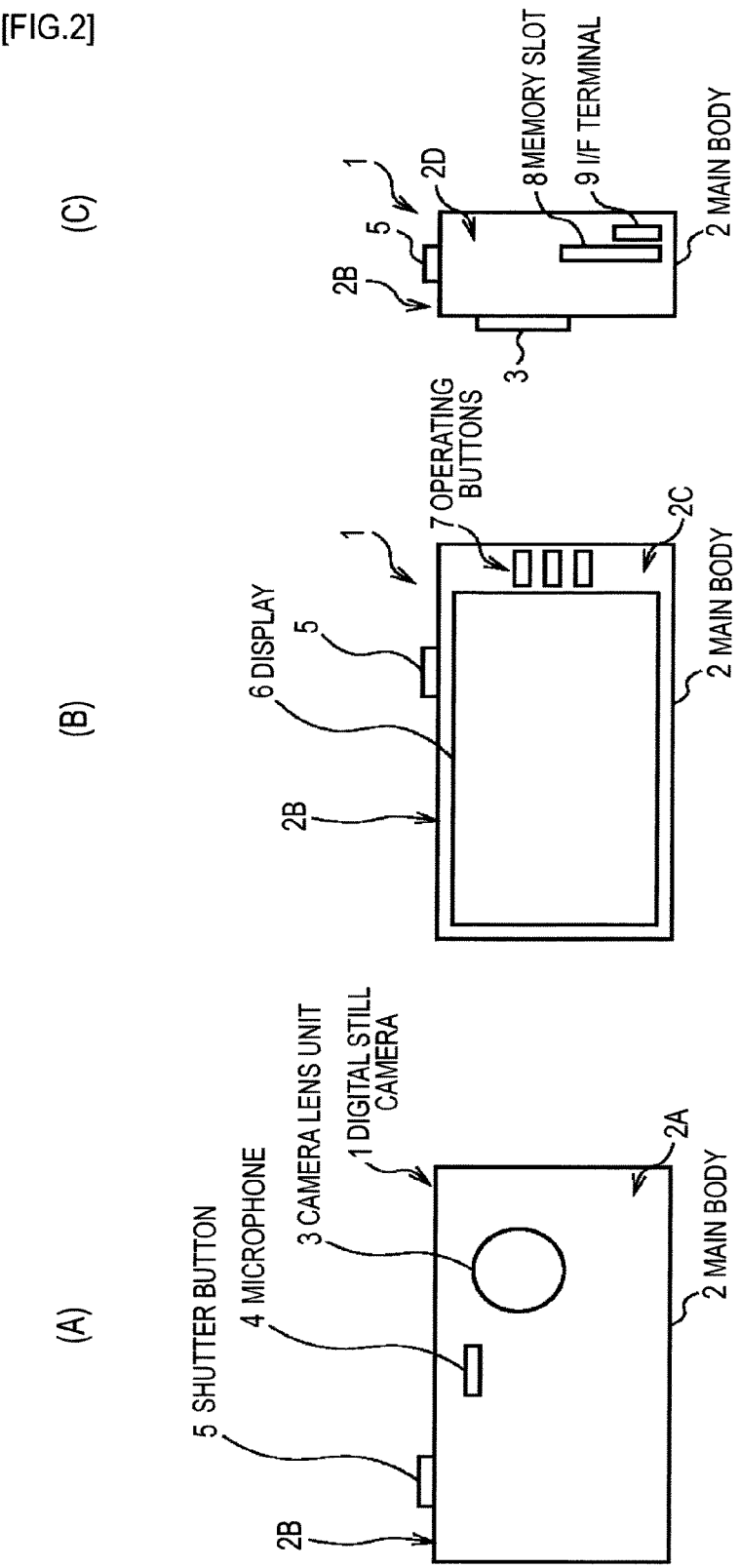

[FIG. 3]
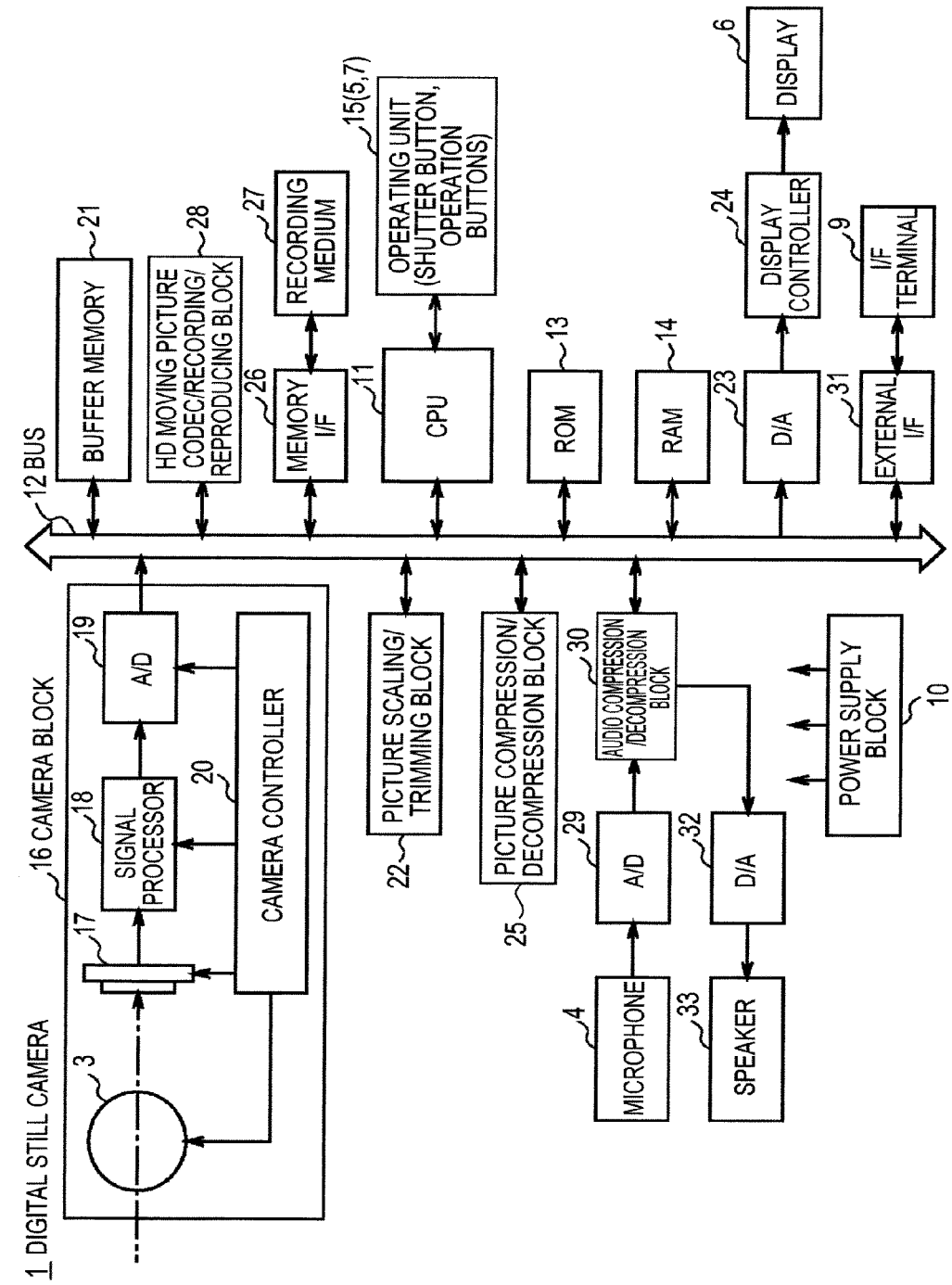

[FIG. 4]
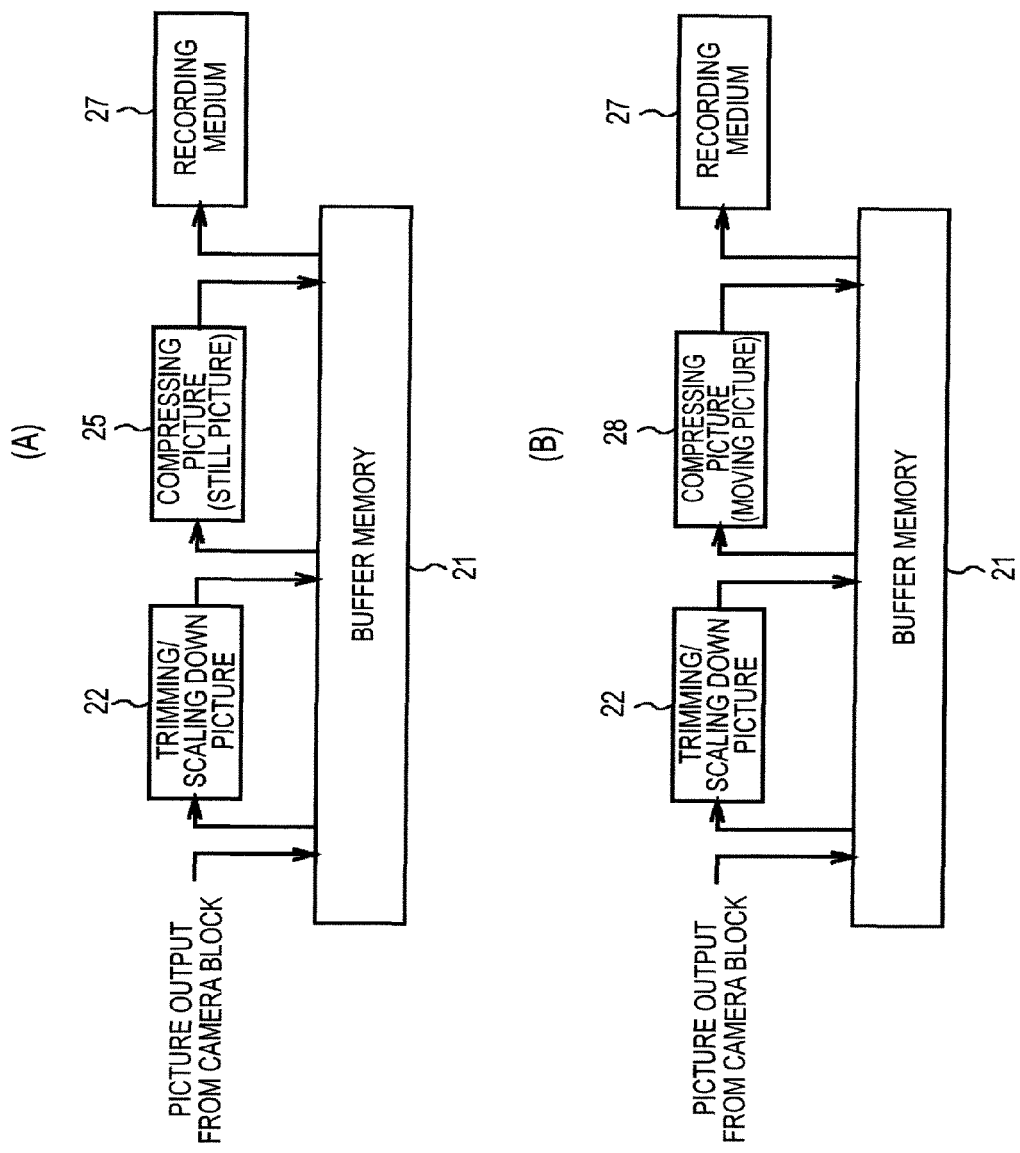

[FIG. 5]
(A)
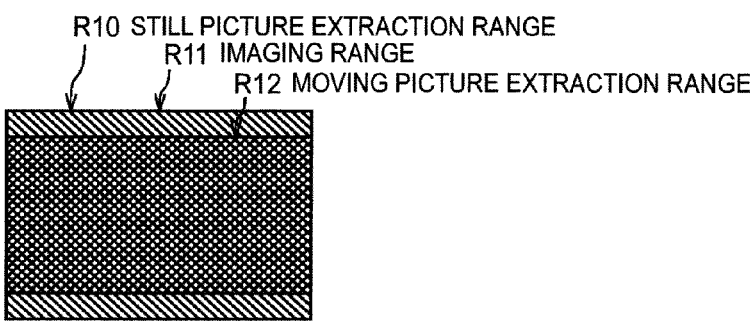
(B)
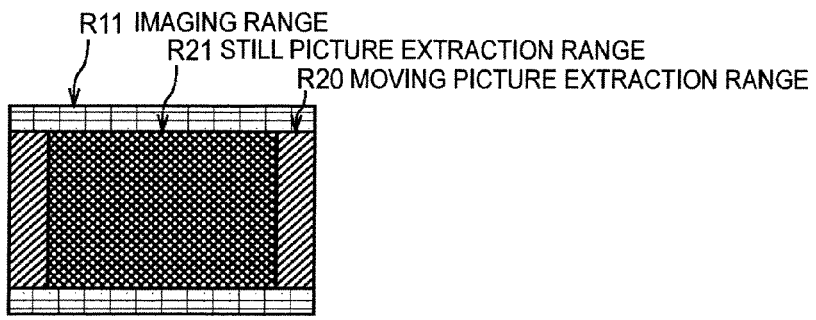
(C)
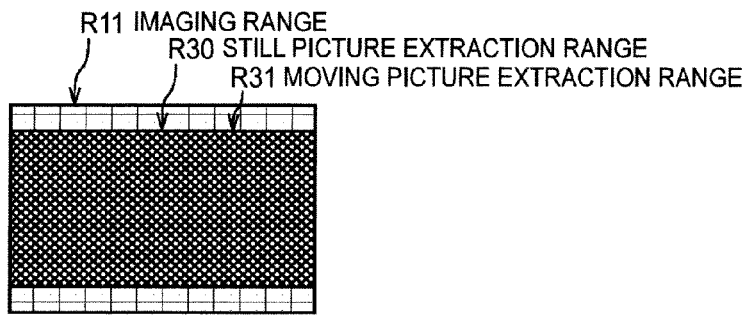

[FIG. 6]
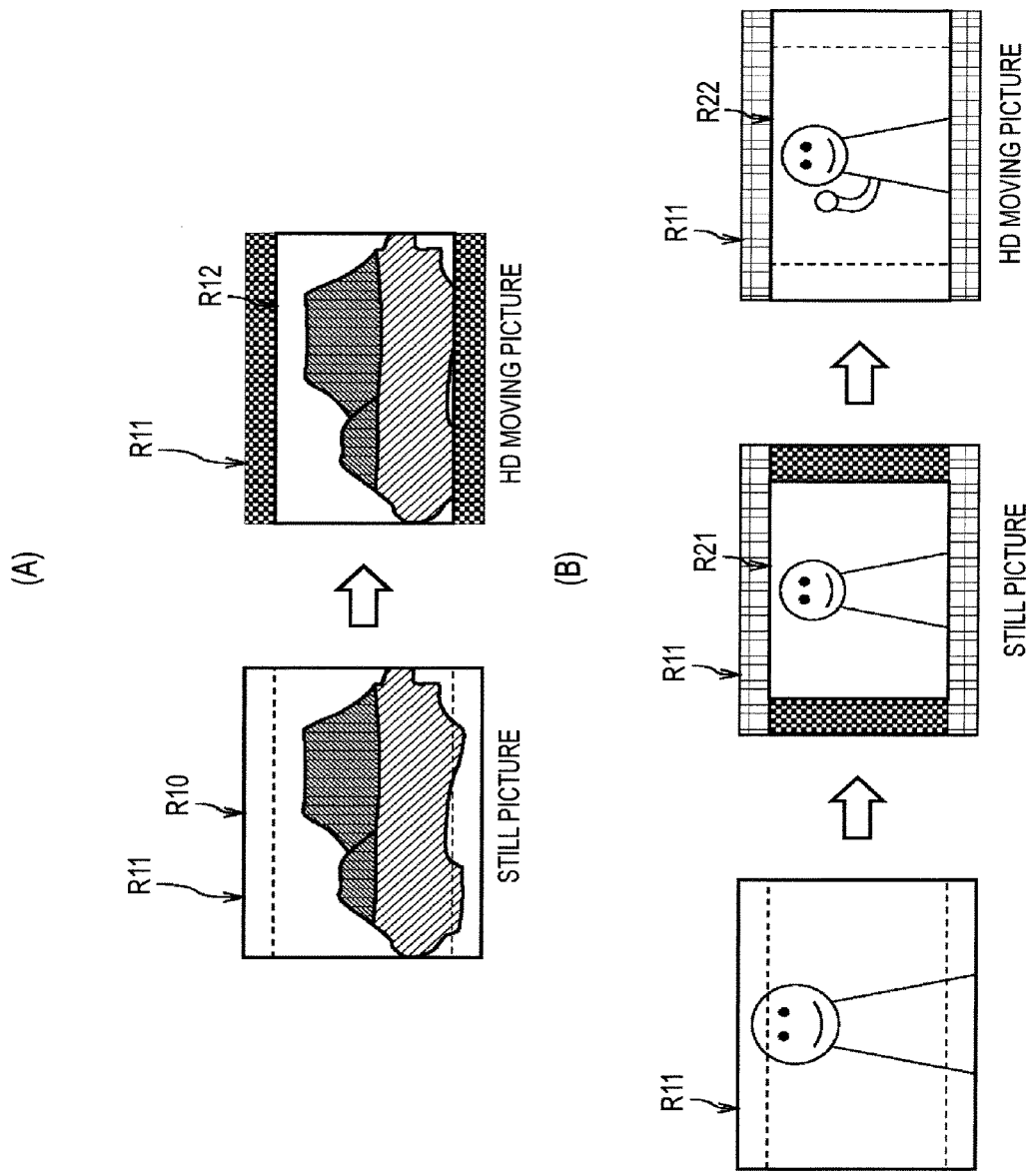

[FIG. 7]
(A)
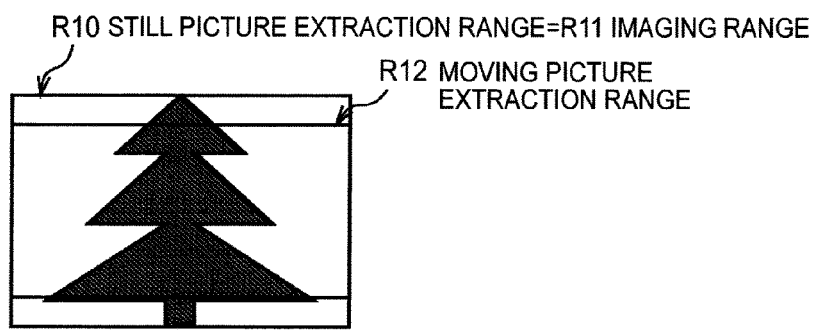
(B)
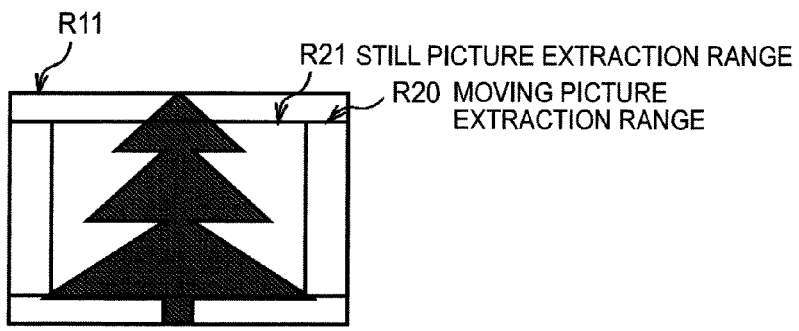
(C)
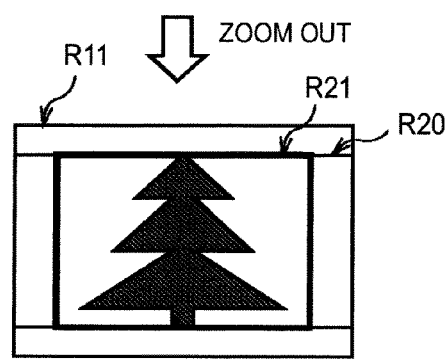
(D)
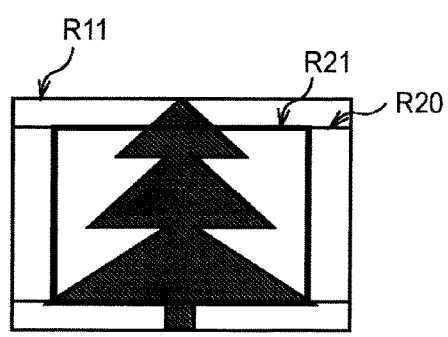

[FIG. 8]
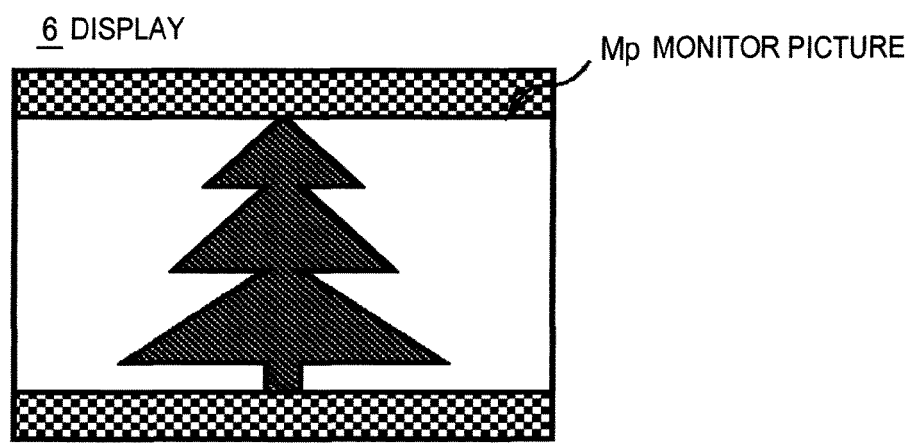

[FIG. 9]
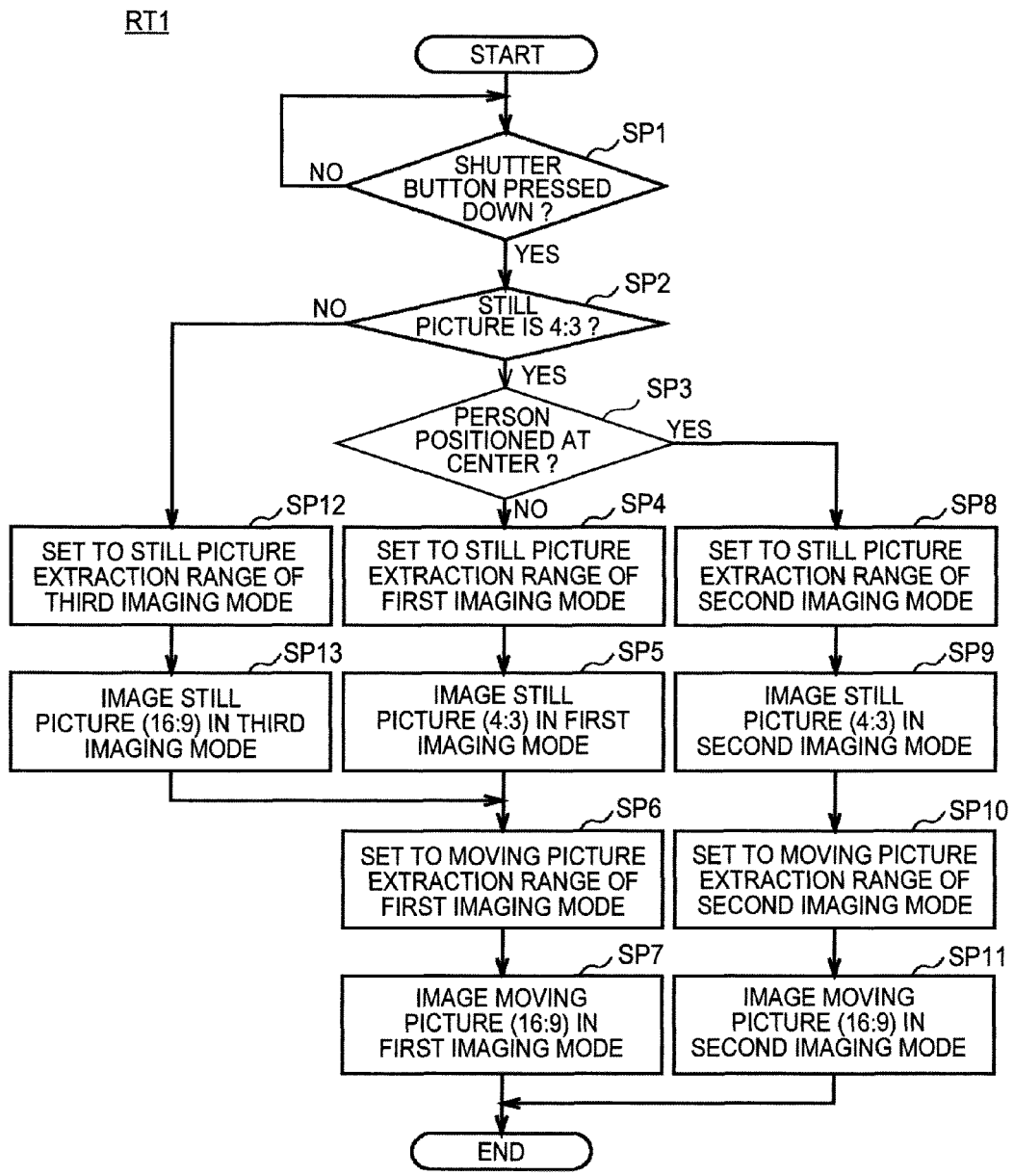

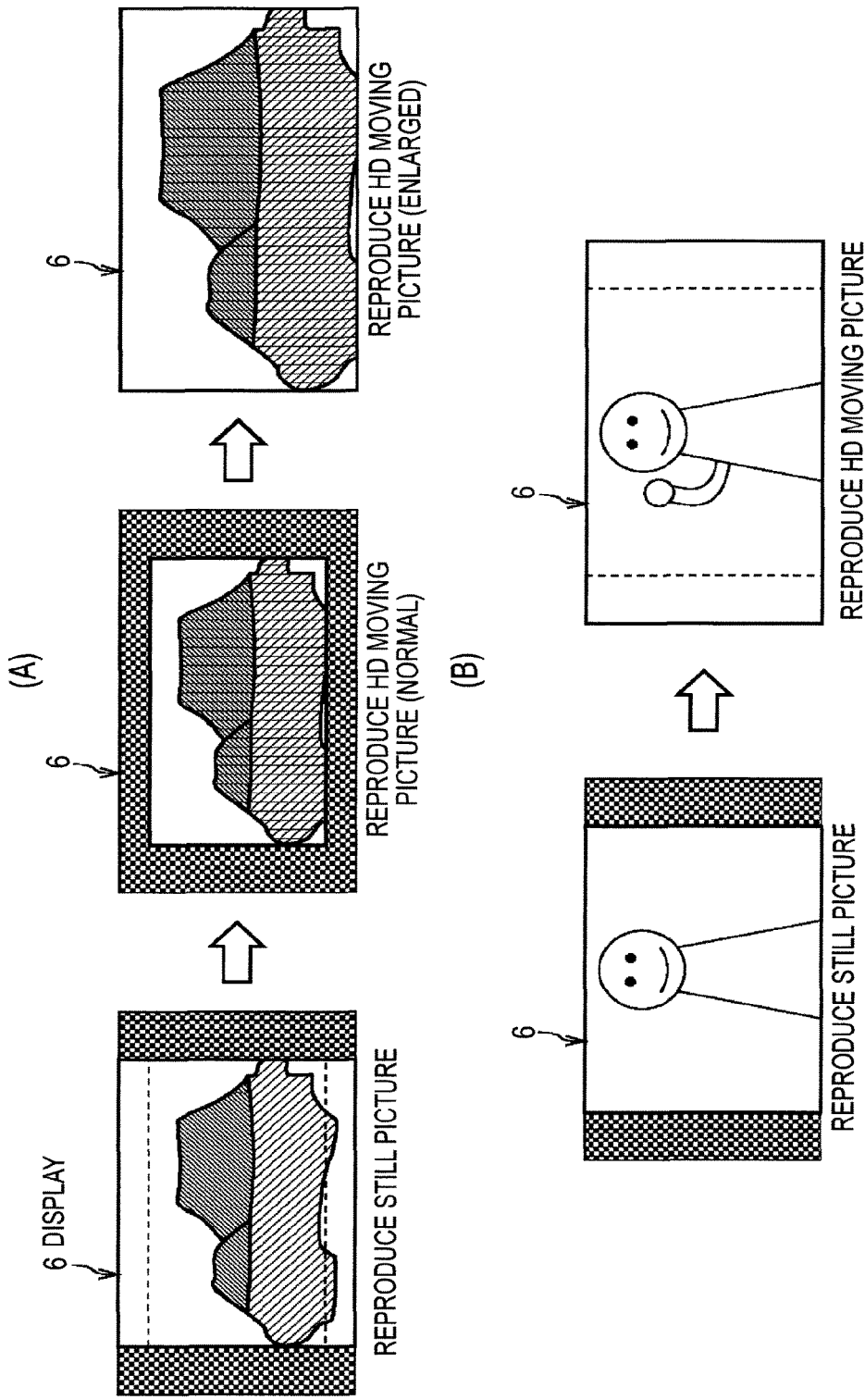
[FIG. 10]

[FIG. 11]
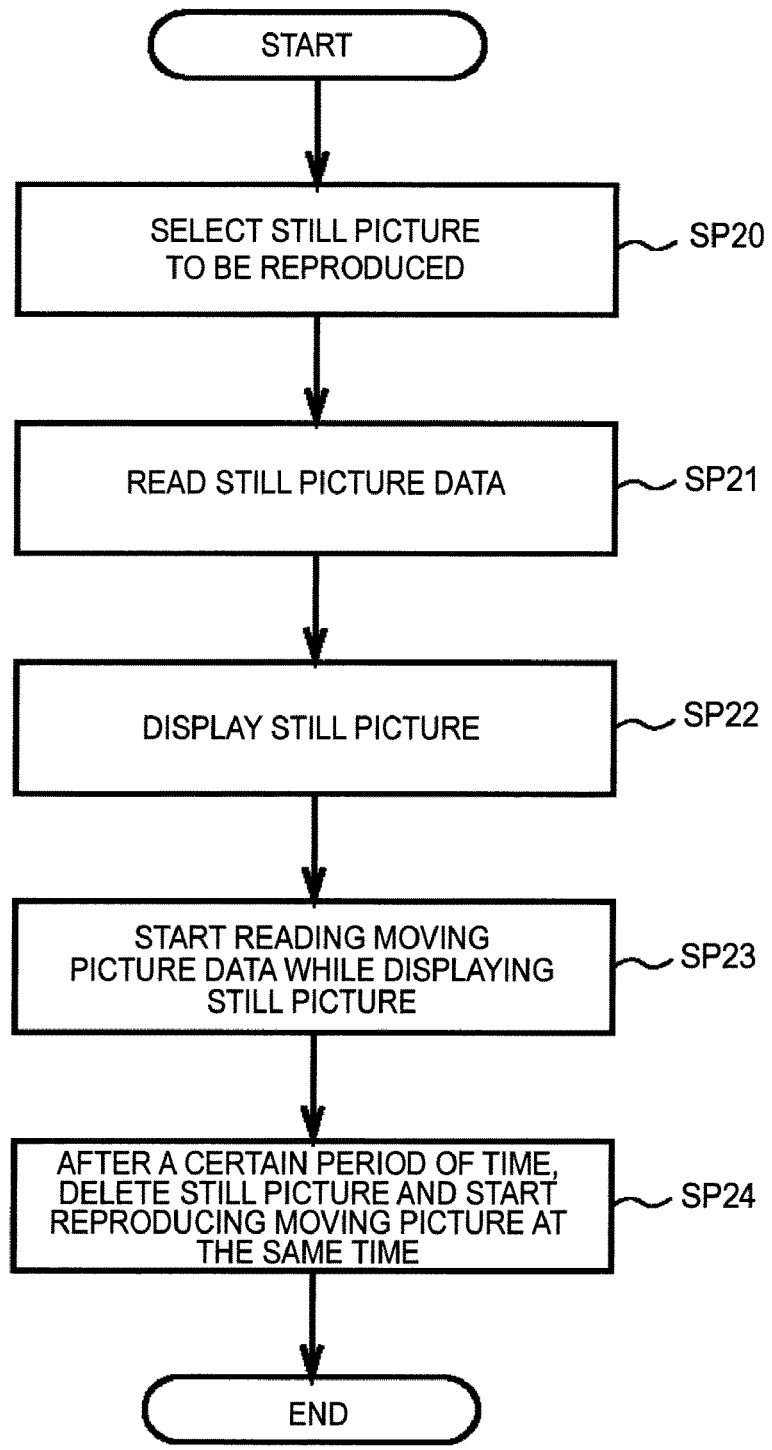

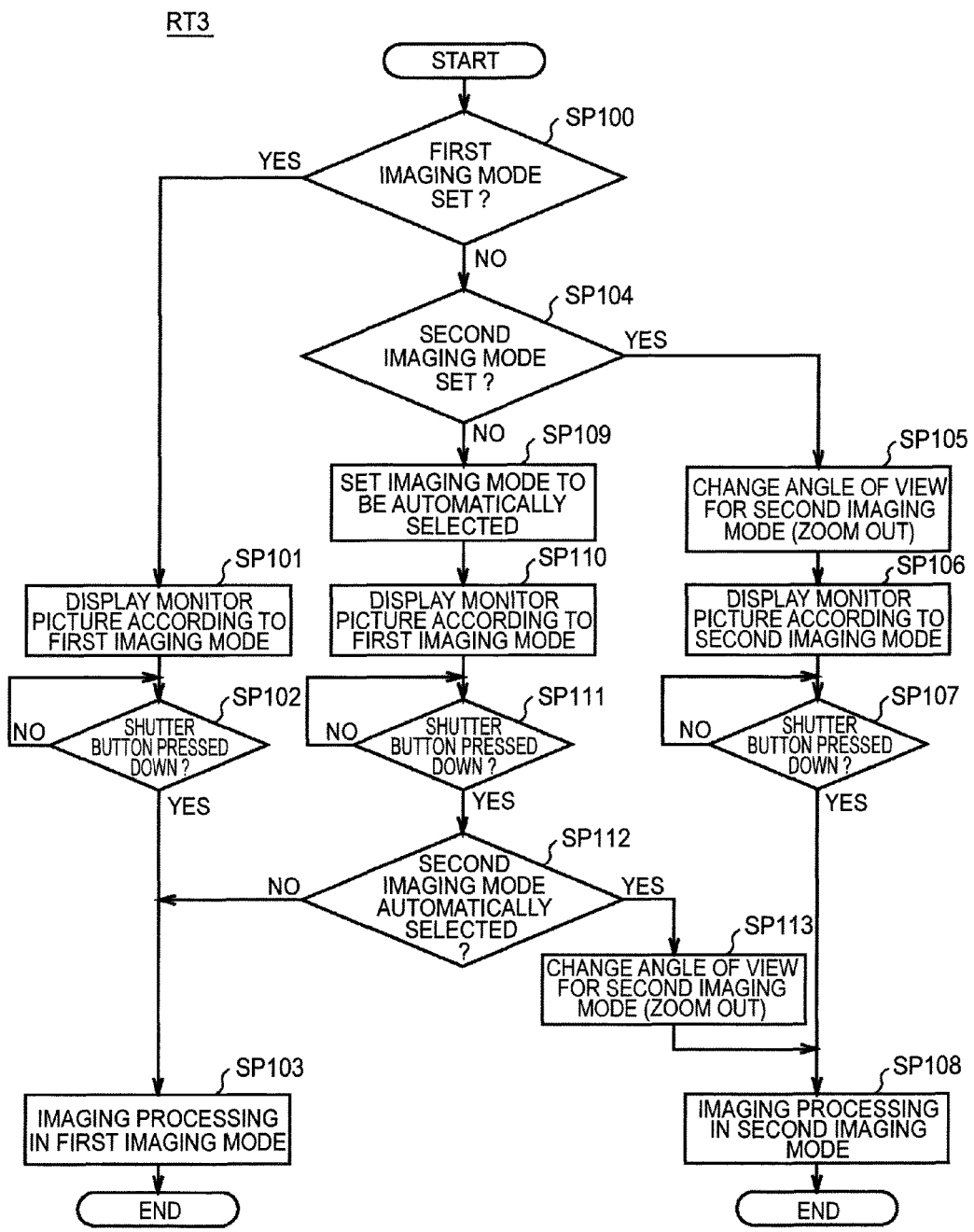

[FIG. 13]
(A)
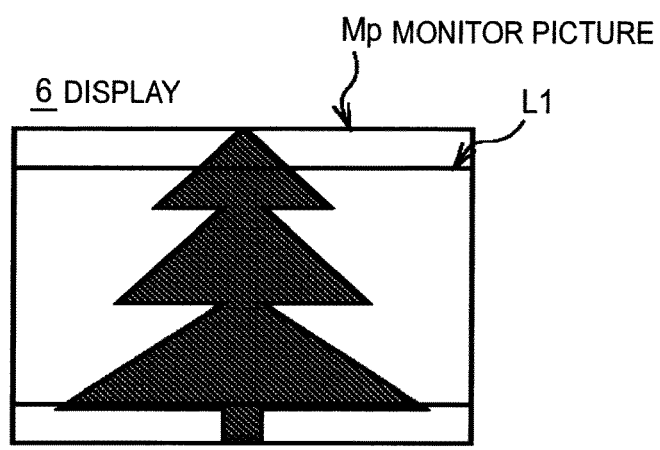
(B)
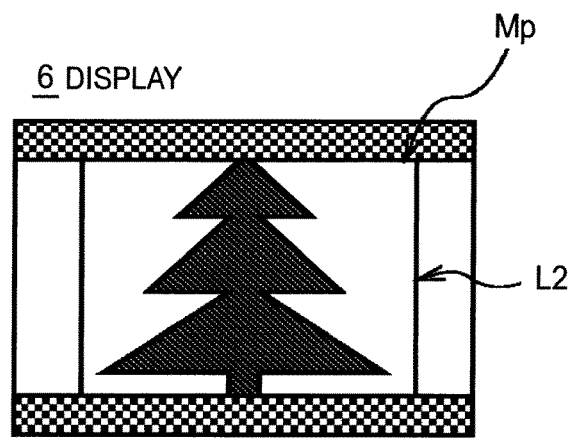

IMAGING DEVICE AND ASSOCIATED METHODOLOGY OF SETTING ADJUSTABLE ASPECT RATIOS

TECHNICAL FIELD

The present invention relates to an imaging apparatus and imaging method. For example, the invention is suitably applied to a digital still camera capable of imaging still and moving pictures.

BACKGROUND ART

In recent years, an imaging apparatus capable of imaging a moving picture in addition to a still picture (e.g., a digital still camera), and an imaging apparatus capable of imaging a still picture in addition to a moving picture (e.g., a digital video camera) have become widely used. By the way, the still picture imaged by the digital still camera is strongly influenced by the culture of photography (e.g., silver halide photography). Therefore, for this still picture, the aspect ratio (the ratio of horizontal length to vertical length) of 4:3 or 3:2 has commonly been used, which is the same as that used in silver halide photography. Also, when printing the still picture, the aspect ratio of 4:3, 3:2 or the like has commonly been used.

On the other hand, the moving picture imaged by the digital still camera is strongly influenced by television broadcasts. Therefore, for this moving picture, the aspect ratio of 4:3 has commonly been used, which is the same as that used in television programs of terrestrial analog broadcasting. Also, in recent years, a television monitor capable of displaying high-resolution television programs of terrestrial digital broadcasting has become widely used, which has driven the development of a digital still camera capable of imaging a moving picture with an aspect ratio of 16:9, which is the same as that used in the high-resolution television programs.

Furthermore, a digital still camera capable of imaging still and moving pictures having different aspect ratios (such as a still picture with an aspect ratio of 4:3 and a moving picture with an aspect ratio of 16:9) in a time-division manner has been proposed (see JP-A-2006-148273, for example).

By the way, when imaging still and moving pictures having different aspect ratios in a time-division manner using a conventional digital still camera, an object is imaged by an imaging unit including a charge-coupled device (CCD), and then, from a picture resulted from the imaging (also referred to as "original picture"), still and moving pictures having desired aspect ratios are generated and recorded to a recording medium.

For example, consider that the aspect ratio of an original picture is 4:3, and according to this, the aspect ratio of a still picture is set to 4:3, and the aspect ratio of a moving picture is set to 16:9. In this case, the above-described digital still camera, for example, records the original picture as a still picture with the same aspect ratio of 4:3, while extracting and recording a moving picture with an aspect ratio of 16:9 from the original picture by trimming the top and bottom of the original picture. Note that this moving picture includes a plurality of temporally successive pictures.

However, when the moving picture is extracted by trimming the top and bottom of the original picture in this way, the range of extracting the moving picture is narrower in vertical direction than the range of imaging the original picture. As the result, as shown in FIG. 1, even if a person is imaged fully using an imaging range R1 displayed on a display of the digital still camera, the head of the person and the like positioned in the top of the original picture is excluded from an extraction range R2 for the moving picture and then truncated.

As the result, the generated moving picture is obviously different from what is intended by a user (that is, a moving picture lacking an important part of the object is generated). The term "object" used herein means a portion that the user intends to image using the imaging apparatus (for example, the upper body of a person, a part of a landscape, etc).

Thus, the conventional digital still camera can record still and moving pictures having different aspect ratios, but the range of extracting a still picture and the range of extracting a moving picture are fixed, so the trimming for changing the aspect ratio may cause a still or moving picture lacking an important part of the object to be recorded.

DISCLOSURE OF THE INVENTION

In view of the above, the present invention proposes an imaging apparatus and imaging method for extracting still and moving pictures having different aspect ratios from an original picture with an extraction range varying according to an imaging mode.

In order to solve the above-described problem, the present invention provides: an imaging unit for imaging an object and outputting a picture within an imaging range; an extraction range setting unit for setting a still picture extraction range with a first aspect ratio within the imaging range and a moving picture extraction range with a second aspect ratio different from the first aspect ratio within the imaging range for each imaging mode; and an image processing unit for extracting from the picture within the imaging range a picture within the still picture extraction range set by the extraction range setting unit as a still picture, and extracting from the picture within the imaging range a picture within the moving picture extraction range set by the extraction range setting unit as a moving picture.

By doing so, the extraction range of the still picture and the extraction range of the moving picture having different aspect ratios can be changed according to the imaging mode.

According to the invention, by providing: an imaging unit for imaging an object and outputting a picture within an imaging range; an extraction range setting unit for setting a still picture extraction range with a first aspect ratio within the imaging range and a moving picture extraction range with a second aspect ratio different from the first aspect ratio within the imaging range for each imaging mode; and an image processing unit for extracting from the picture within the imaging range a picture within the still picture extraction range set by the extraction range setting unit as a still picture, and extracting from the picture within the imaging range a picture within the moving picture extraction range set by the extraction range setting unit as a moving picture, the extraction range of the still picture and the extraction range of the moving picture having different aspect ratios can be changed according to the imaging mode, and thus, an imaging apparatus and imaging method for extracting still and moving pictures having different aspect ratios from an original picture from within an extraction range suitable for an imaging mode can be provided.

BRIEF DESCRIPTION OF THE DRAWINGS

FIG. 1 is a schematic diagram showing a moving picture with an aspect ratio of 16:9 generated by trimming the top and bottom of an imaged picture with an aspect ratio of 4:3.

FIG. 2 is a schematic diagram showing (A) the front surface, (B) the rear surface, and (C) one of the side surfaces of the exterior configuration of a digital still camera in accordance with a first embodiment.

FIG. 3 is a block diagram showing the interior configuration of the digital still camera in accordance with the first embodiment.

FIG. 4 is a schematic diagram showing a flow of (A) still picture imaging and (B) moving picture imaging.

FIG. 5 is a schematic diagram showing a still picture extraction range and a moving picture extraction range in (A) a first, (B) a second, and (C) a third imaging modes.

FIG. 6 is a schematic diagram for describing the imaging of still and HD moving pictures in (A) the first and (B) the second imaging modes.

FIG. 7 is a schematic diagram for describing the control of the angle of view in the first and second modes: (A) shows the first imaging mode; (B) shows the case when a shutter button is pressed down in the second imaging mode; (C) shows the case of matching the angle of view of the first imaging mode to that of the still picture extraction range by automatically zooming out; and (D) shows the case of not zooming out.

FIG. 8 is a schematic diagram showing a monitor picture displayed in the third imaging mode.

FIG. 9 is a flowchart showing a imaging processing procedure in accordance with the first embodiment.

FIG. 10 is a schematic diagram for describing the reproduction of still and HD moving pictures.

FIG. 11 is a flowchart showing a reproducing processing procedure.

FIG. 12 is a flowchart showing a imaging processing procedure in accordance with a second embodiment.

FIG. 13 is a schematic diagram showing an example of displaying a monitor picture in (A) the first and (B) the second imaging modes in accordance with the second embodiment.

BEST MODE FOR CARRYING OUT THE INVENTION

Embodiments of the present invention are described below in detail with reference to the drawings.

(1) First Embodiment (1-1) Exterior Configuration of Digital Still Camera

FIGS. 2(A), 2(B), and 2(C) show an exterior configuration of a digital still camera generally indicated as 1, capable of imaging a high definition (HD) moving picture. The digital still camera 1 includes a flat and rectangular shaped main body 2 including a camera lens unit 3 on a front surface 2A. The camera lens unit 3 includes an imaging lens and iris for imaging an object. Additionally, a microphone 4 for capturing a sound is provided on the front surface 2A.

A shutter button 5 is provided on a top surface 2B of the main body 2. The digital still camera 1 images a still or HD moving picture when the shutter button 5 is pressed down.

A display 6 is provided on a rear surface 2C of the main body 2, which has approximately the same size as the rear surface 2C and an aspect ratio of 16:9. For example, the display 6 displays the object in imaging, and displays the imaged still or HD moving picture in reproducing. Additionally, two or more operating buttons 7 are provided near the display 6 on the rear surface 2C. The digital still camera 1 performs various setting relating the imaging of still and HD moving pictures according to a pressing down operation of the operating buttons 7.

A memory slot 8 is provided on one side surface 2D of the main body 2, into which a recording medium capable of recording data of the still picture (also referred to as "still picture data") and data of the HD moving picture (also referred to as "HD moving picture data") is inserted. Additionally, an interface (I/F) terminal 9 for connecting to an external device via a cable (not shown) is provided near the memory slot 8 on the one side surface 2D. The digital still camera 1 outputs the still or HD moving picture to a television monitor connected via the I/F terminal 9, and sends/receives various data to/from a personal computer connected via the I/F terminal 9.

(1-2) Interior Configuration of Digital Still Camera

Next, the interior configuration of the digital still camera 1 is described with reference to FIG. 3. The components of the digital still camera 1 operate on the energy (power) supplied from a power supply block 10. In the digital still camera 1, a central processing unit (CPU) 11 intensively controls the components by reading a program from a read only memory (ROM) 13 connected via a bus 12 and expanding/executing the program in a random access memory (RAM) 14.

Specifically, for example, when the CPU 11 recognizes that the operation of switching to an imaging mode for imaging a still picture or an imaging mode for imaging an HD moving picture or an imaging mode for imaging both still and HD moving pictures has been performed using an operating unit 15 including the shutter button 5 and the operating buttons 7, the CPU 11 sends a control signal according to the operation to a camera block 16 via the bus 12.

The camera block 16 includes the camera lens unit 3 capable of zooming, an imaging device 17, a signal processor 18, an analog-to-digital (A/D) converter 19, and a camera controller 20. The camera controller 20 controls the components of the camera block 16 based on the control signal sent from the CPU 11. The imaging device 17 includes, for example, a CCD or complementary metal oxide semiconductor (CMOS) including pixels in an effective display area (also referred to as "effective pixels") of 4000 (H)×3000 (V), that is, a CCD or CMOS with an aspect ratio of 4:3. Note that this effective display area corresponds to the imaging range of the imaging device 17.

The camera controller 20 causes the imaging device 17 to perform photoelectric conversion on an image light captured by the camera lens unit 3 based on the control signal from the CPU 11. Then, the camera controller 20 causes the signal processor 18 to perform a predetermined signal processing on a picture signal resulted from the photoelectric conversion. Then, the camera controller 20 causes the A/D converter 19 to perform A/D conversion on the picture signal and output the result.

The CPU 11 sends the digital picture signal output from the camera block 16 to a buffer memory 21 via the bus 12 and store it as picture data in the buffer memory 21. The picture size of this picture data stored in the buffer memory 21 is the same as the effective pixels of the imaging device 17 (i.e., 4000 (H)×3000 (V)). Note that the picture size means the number of pixels included in the picture data expressed as the number of horizontal pixels by vertical pixels.

The CPU 11 reads the picture data stored in the buffer memory 21 and inputs it to a picture scaling/trimming block 22 via the bus 12. The picture scaling/trimming block 22, under the control of the CPU 11, trims (if needed) the input picture data of 4000 (H)×3000 (V), then scales down the picture data to the picture size corresponding to the resolution of the display 6. This scaling down means reducing the picture size of the picture data by thinning out pixels without changing the aspect ratio.

The picture data output from the picture scaling/trimming block 22 is input to an digital-to-analog (D/A) converter 23 via the bus 12 under the control of the CPU 11. The D/A converter 23 performs D/A conversion on the input picture data to provide an analog picture signal. This picture signal is sent to a display controller 24. The display controller 24 displays a picture based on this picture signal, or a picture of the object, on the display 6. Note that the picture displayed on the display 6 in this way is also referred to as "monitor picture."

Thus the digital still camera 1 allows a user to confirm an object to be recorded, by displaying a monitor picture of the object imaged by the imaging device 17 on the display 6.

Then, in the imaging mode for imaging a still picture, when the CPU 11 recognizes that the operation of, for example, pressing down the shutter button 5 of the operating unit 15 (also referred to as "still picture imaging operation") has been performed, the CPU 11 sends a digital picture signal output from the camera block 16 at this point to the buffer memory 21 via the bus 12 and stores it as picture data in the buffer memory 21, as shown in FIG. 3 and additionally in FIG. 4(A). Accordingly, the picture size of this picture data stored in the buffer memory 21 is the same as the effective pixels of the imaging device 17 (i.e., 4000 (H)×3000 (V)).

The CPU 11 reads the picture data thus stored in the buffer memory 21 and inputs it to the picture scaling/trimming block 22 via the bus 12. The picture scaling/trimming block 22, under the control of the CPU 11, trims (if needed) the input picture data of 4000 (H)×3000 (V) to extract therefrom a picture data within an extraction range set for still picture (an extraction range with an aspect ratio of 4:3 or 16:9, also referred to as "still picture extraction range"), and then scales down the input picture data (not trimmed) or extracted picture data to a picture size specified by the user (without changing the aspect ratio). Note that the still picture extraction range means a range included in the imaging range of the imaging device 17, from within which the still picture will be extracted. Extracting a picture within the still picture extraction range as still picture from a picture within the imaging range of the imaging device 17 is also referred to as "imaging a still picture." The picture data thus output from the picture scaling/trimming block 22 is sent to the buffer memory 21 via the bus 12 and stored therein, and then is read from the buffer memory 21 and input to a picture compression/decompression block 25, under the control of the CPU 11. The picture compression/decompression block 25, under the control of the CPU 11, compresses and encodes the input picture data using a predetermined still picture compression encoding method to provide compressed picture data. The CPU 11 sends the compressed picture data output from the picture compression/decompression block 25 to the buffer memory 21 via the bus 12 and store it in the buffer memory 21.

The CPU 11 reads the compressed picture data thus stored in the buffer memory 21 whenever necessary, and records it as still picture data to a recording medium 27 via the bus 12 and a memory interface (memory I/F) 26. In this way, the digital still camera 1 images a still picture and records it to the recording medium 27.

Also, in the imaging mode for imaging an HD moving picture, when the CPU 11 recognizes that the operation of, for example, pressing down the shutter button 5 of the operating unit 15 (also referred to as "moving picture imaging start operation") has been performed, the CPU 11 sends a digital picture signal output from the camera block 16 to the buffer memory 21 via the bus 12 and stores it as picture data in the buffer memory 21, as shown in FIG. 3 and additionally in FIG. 4(B). The picture size of this picture data stored in the buffer memory 21 is the same as the effective pixels of the imaging device 17 (i.e., 4000 (H)×3000 (V)).

The CPU 11 reads the picture data thus stored in the buffer memory 21 and inputs it to the picture scaling/trimming block 22 via the bus 12. The picture scaling/trimming block 22, under the control of the CPU 11, trims the input picture data of 4000 (H)×3000 (V) to extract therefrom a picture data within an extraction range set for HD moving picture (an extraction range with an aspect ratio of 16:9, also referred to as "moving picture extraction range"), and then scales down the extracted picture data to a picture size specified by the user (without changing the aspect ratio). Note that the moving picture extraction range means a range included in the imaging range of the imaging device 17, from within which the HD moving picture will be extracted. Extracting a picture within the moving picture extraction range as HD moving picture from a picture within the imaging range of the imaging device 17 is also referred to as "imaging an HD moving picture."

The picture data thus output from the picture scaling/trimming block 22 is sent to the buffer memory 21 via the bus 12 and stored therein, and then is read from the buffer memory 21 and input to an HD moving picture codec/recording/reproducing block 28, under the control of the CPU 11. The HD moving picture codec/recording/reproducing block 28, under the control of the CPU 11, compresses and encodes the input picture data using a predetermined moving picture compression encoding method to provide compressed picture data. The CPU 11 sends the compressed picture data output from the HD moving picture codec/recording/reproducing block 28 to the buffer memory 21 via the bus 12 and store it in the buffer memory 21.

Also, the digital still camera 1 collects an ambient sound and converts it to an audio signal using the microphone 4. This audio signal is A/D converted by an A/D converter 29 and then input to an audio compression/decompression block 30. The audio compression/decompression block 30, under the control of the CPU 11, compresses the input digital audio signal using a predetermined audio compression encoding method to provide compressed audio data. The CPU 11 sends the compressed audio data output from the audio compression/decompression block 30 to the buffer memory 21 via the bus 12 and store it in the buffer memory 21.

Then, the CPU 11 reads the compressed picture data and compressed audio data stored in the buffer memory 21 whenever necessary, generates a moving picture stream by time-division multiplexing the compressed picture data and compressed audio data, and records the moving picture stream as HD moving picture data to the recording medium 27 via the bus 12 and the memory I/F 26.

The CPU 11 continues this processing until the operation of, for example, pressing down again the shutter button 5 of the operating unit 15 (also referred to as "moving picture imaging stop operation") is performed, or until a predetermined time elapses. In this way, the digital still camera 1 images an HD moving picture and records it to the recording medium 27.

In addition to imaging and recording a still picture and an HD moving picture individually, the digital still camera 1 can automatically image and record a still picture and an HD moving picture at a time in response to one operation of pressing down the shutter button 5. In this case, the processing of imaging and recording the still picture and the processing of imaging and recording the HD moving picture are performed in series. Specifically, in the imaging mode for imaging both the still picture and the HD moving picture, when the CPU 11 recognizes that the operation of pressing down the shutter button 5 (also referred to as "both pictures imaging start operation") has been performed, the CPU 11, first, images the still picture as described above, and then immediately, automatically images the HD moving picture.

The still picture data and HD moving picture data of the still picture and HD moving picture thus imaged in series are recorded to the recording medium 27, associated with each other by a file name or a database constructed in the recording medium 27.

Also, when the CPU 11 of the digital still camera 1 recognizes that the operation of switching to a reproducing mode for reproducing a recorded still picture, a recorded HD moving picture or both has been performed using the operating unit 15, the CPU 11 sends a control signal corresponding to the operation to the camera block 16 via the bus 12. Under the control of the camera controller 20, the camera block 16 temporarily stops its operation based on the control signal from the CPU 11.

Also, in the reproducing mode, when the CPU 11 recognizes that the operation of reproducing a specified still picture (also referred to as "still picture reproducing operation") has been performed using the operating unit 15, the CPU 11 reads the specified still picture data from the recording medium 27 via the bus 12 and the memory I/F 26, and inputs this still picture data to the picture compression/decompression block 25 via the bus 12.

The picture compression/decompression block 25, under the control of the CPU 11, decodes the input still picture data to provide the original picture data. The picture data thus output from the picture compression/decompression block 25 is input to the picture scaling/trimming block 22 via the bus 12, under the control of the CPU 11. The picture scaling/trimming block 22, under the control of the CPU 11, scales down the input picture data to a picture size that can be displayed on the display 6.

The picture data output from the picture scaling/trimming block 22 is input to the D/A converter 23 via the bus 12 under the control of the CPU 11. The D/A converter 23 performs D/A conversion on the input picture data to provide an analog picture signal. This picture signal is sent to the display controller 24. The display controller 24 displays a still picture based on this picture signal on the display 6.

Also, when a television monitor is connected via the I/F terminal 9, the CPU 11, for example, sends the picture data output from the picture compression/decompression block 25 to the television monitor via the bus 12, an external interface (I/F) 31, and the I/F terminal 9. As a result, a still picture based on this picture data is displayed on the television monitor. In this way, the digital still camera 1 reproduces a still picture.

Also, in the reproducing mode, when the CPU 11 recognizes that the operation of reproducing a specified HD moving picture (also referred to as "moving picture reproducing operation") has been performed using the operating unit 15, the CPU 11, in response to the operation, reads the specified HD moving picture data from the recording medium 27 via the bus 12 and the memory I/F 26. Then, the CPU 11 separates a compressed picture data and a compressed audio data from the read HD moving picture data, then inputs the compressed picture data to the HD moving picture codec/recording/reproducing block 28 via the bus 12, while inputting the compressed audio data to the audio compression/decompression block 30 via the bus 12.

The HD moving picture codec/recording/reproducing block 28, under the control of the CPU 11, decodes the input compressed picture data to provide the original picture data. The picture data thus output from the HD moving picture codec/recording/reproducing block 28 is input to the picture scaling/trimming block 22 via the bus 12, under the control of the CPU 11. The picture scaling/trimming block 22, under the control of the CPU 11, scales down the input picture data to the picture size that can be displayed on the display 6.

The picture data output from the picture scaling/trimming block 22 is input to the D/A converter 23 via the bus 12 under the control of the CPU 11. The D/A converter 23 performs D/A conversion on the input picture data to provide an analog picture signal. This picture signal is sent to the display controller 24. The display controller 24 displays a HD moving picture based on this picture signal on the display 6.

At the same time, the audio compression/decompression block 30, under the control of the CPU 11, decodes the input compressed audio data to provide the original audio data. The audio data thus output from the audio compression/decompression block 30 is input to a D/A converter 32.

The D/A converter 32 performs D/A conversion on the input audio data to provide an analog audio signal. This audio signal is sent to a speaker 33, which outputs a sound based on this audio signal.

Also, when the television monitor is connected via the I/F terminal 9, the CPU 11, for example, sends the picture data output from the HD moving picture codec/recording/reproducing block 28 and the audio data output from the audio compression/decompression block 30 to the television monitor via the bus 12, the external I/F 31, and the I/F terminal 9. As a result, the television monitor displays an HD moving picture based on this picture data, while outputting a sound based on this audio data from its speaker. In this way, the digital still camera 1 reproduces the HD moving picture with the accompanying sound.

Also, in the digital still camera 1, when the still picture and the HD moving picture are associated with each other by a file name or a database constructed in the recording medium 27, the digital still camera 1 can reproduce the still picture in response to the still picture reproducing operation, and then immediately, automatically reproduce the HD moving picture associated with this still picture.

Also, the CPU 11 is capable of face recognition. For example, the CPU 11 uses a predetermined face recognition algorithm to analyze a digital picture signal output from the camera block 16 and determine whether or not a human face exists within the picture based on this picture signal. Specifically, for example, the CPU determines whether or not a human face exists within the picture based on feature points such as face profile, eyes, and nose of a human face.

In addition, the digital still camera 1 has two or more imaging modes including different settings of the still picture extraction range and moving picture extraction range, as an imaging mode for imaging both a still picture and an HD moving picture. For example, the digital still camera 1 has a first imaging mode, a second imaging mode, and a third imaging mode. These modes are described below in detail in this order.

(1-3) Imaging Modes (1-3-1) First Imaging Mode

The first imaging mode uses aspect ratios of 4:3 for still picture and 16:9 for HD moving picture, and is suitable for imaging a landscape. In this mode, as shown in FIG. 5(A), a still picture extraction range R10 is set to the same range as an imaging range R11 of the imaging device 17 with an aspect ratio of 4:3. On the other hand, a moving picture extraction range R12 is set to a range with an aspect ratio of 16:9 into which the imaging range R11 (still picture extraction range R10) is trimmed at the top and bottom, the horizontal length being the same as that of the imaging range R11, if the horizontal longer side is aligned parallel to that of the imaging range R11. In other words, the imaging range R11 with an aspect ratio of 4:3 is trimmed (cropped) into the moving picture extraction range R12 with an aspect ratio of 16:9. That is, in the first imaging mode, the still picture extraction range R10 is set to the same range as the imaging range R11 of the imaging device 17 (with an aspect ratio of 4:3), and the moving picture extraction range R12 is set to a range into which the imaging range R11 of the imaging device 17 (still picture extraction range R10) is trimmed at the top and bottom (with an aspect ratio of 16:9).

For example, in imaging a still picture in the first imaging mode, the CPU 11 of the digital still camera 1 uses the whole of the imaging range R11 of the imaging device 17 as the still picture extraction range R10, as shown in FIG. 6(A), allowing a high-definition still picture with an aspect ratio of 4:3 to be imaged. On the other hand, in imaging an HD moving picture in the first imaging mode, the first imaging mode assumes the imaging of an object in which an important part is positioned at the center of the imaging range R11, such as a landscape. So, even if an HD moving picture is extracted from within the moving picture extraction range R12, into which the imaging range R11 (i.e., the still picture extraction range R10) is trimmed at the top and bottom, an HD moving picture with an aspect ratio of 16:9 can be imaged without cropping the important part of the object.

(1-3-2) Second Imaging Mode

The second imaging mode uses aspect ratios of 4:3 for still picture and 16:9 for HD moving picture, and is suitable for imaging a person. In this mode, as shown in FIG. 5(B), a moving picture extraction range R20 is set to a range with an aspect ratio of 16:9 into which the imaging range R11 of the imaging device 17 is trimmed at the top and bottom, the horizontal length being the same as that of the imaging range R11, if the horizontal longer side is aligned parallel to that of the imaging range R11. On the other hand, a still picture extraction range R21 is set to a range with an aspect ratio of 4:3 into which the moving picture extraction range R20 is trimmed at the left and right edges, the vertical length being the same as that of the moving picture extraction range R20, if the vertical shorter side is aligned parallel to that of the moving picture extraction range R20. In other words, the imaging range R11 with an aspect ratio of 4:3 is cropped into the still picture extraction range R21 with an aspect ratio of 4:3 and the moving picture extraction range R20 with an aspect ratio of 16:9.

That is, in the second imaging mode, the still picture extraction range R21 is set to a range into which the imaging range R11 of the imaging device 17 is trimmed at the top, bottom, and left and right edges (with an aspect ratio of (4:3), and the moving picture extraction range R20 is set to a range into which the still picture extraction range R21 is expanded at the left and right edges (with an aspect ratio of 16:9).

In imaging a still picture and an HD moving picture in the second imaging mode, when the shutter button 5 is pressed down, the digital still camera 1, for example, controls a zooming mechanism of the camera block 16 to shorten the focal length to widen the angle of view of the imaging range R11 so that an important part of the object will not be included in the portion to be trimmed of the top and bottom of the imaging range R11, as shown in FIG. 6(B).

Specifically, the digital still camera 1 zooms out with the camera block 16 to match the angle of view of the still picture extraction range R21 to the angle of view of the imaging range R11 when the shutter button 5 is pressed down (that is, the angle of view of a monitor picture displayed on the display 6).

The angle of view expresses a range of the object to be imaged in angle. Then, widening the angle of view of the imaging range R11 means widening the range of the object to be imaged within the imaging range R11.

At this time, the ratio of the angle of view of the imaging range R11 to the still picture extraction range R21 is 16/9, so the digital still camera 1 controls the zooming mechanism to widen the angle of view of the imaging range R11 by nine-sixteenth times. Note that the amount of lens control for the zooming mechanism depends on an optical mechanism such as the positional relation between the camera lens unit 3 and the imaging device 17, so a calculation equation for controlling the amount of extruding the camera lens unit 3 is determined depending on the optical mechanism to figure out the amount of zooming.

Based on the above, the digital still camera 1 extracts the still picture from within the still picture extraction range R21, and extracts the HD moving picture from within the moving picture extraction range R20.

The second imaging mode assumes the imaging of an object in which an important part such as a person is positioned at the center of the imaging range R11, and may also positioned in the top or bottom. Then, the angle of view of the imaging range R11 is widened by zooming out in advance so that the important part of the object will not be included in the portion to be trimmed of the top and bottom of the imaging range R11, then the still picture is extracted from within the still picture extraction range R21 into which the imaging range R11 is trimmed at the top, bottom, and left and right edges, and then the HD moving picture is extracted from within the moving picture extraction range R20 into which the still picture extraction range R21 is expanded at the left and right edges.

By doing so, in the second imaging mode, even when pressing down the shutter button 5 while fully using the imaging range R11 (that is, fully using a monitor picture displayed on the display 6) to image the object, the HD moving picture with an aspect ratio of 16:9 can be imaged without cropping the important part of the object.

Also, in the second imaging mode, the still picture with an aspect ratio of 4:3 can be imaged without cropping the important part of the object by zooming out to widen the angle of view of the imaging range R11 in order to match the angle of view of the imaging range R11 to the angle of view of the still picture extraction range R21.

Furthermore, in the second imaging mode, as described above, the still picture can be imaged also with the same angle of view as the first imaging mode by zooming out to widen the angle of view of the imaging range R11 in order to match the angle of view of the imaging range R11 (that is, the angle of view of the still picture extraction range R10 of the first imaging mode) to the angle of view of the still picture extraction range R21.

That is, the still picture extraction range R10 of the first imaging mode is the same as the imaging range R11 as shown in FIG. 7(A). This means that, in the first imaging mode, the still picture with the same angle of view as that of a monitor picture displayed on the display 6 is imaged.

On the other hand, the still picture extraction range R21 of the second imaging mode is a range into which the imaging range R11 is trimmed at the top, bottom, and left and right edges, as shown in FIG. 7(B). In this mode, when the shutter button 5 is pressed down, the digital still camera 1 zooms out with the camera block 16 to match the angle of view of the still picture extraction range R21 to the angle of view of the imaging range R11 when the shutter button 5 is pressed down (that is, the angle of view of the still picture extraction range R10 of the first imaging mode), as shown in FIG. 7(C).

By doing so, the digital still camera 1 can image the still picture with the same angle of view between the first and second imaging modes. Note that, when not zooming out, the angle of view of the still picture extraction range R21 of the second imaging mode is narrower than the angle of view of the still picture extraction range R10 of the first imaging mode, so the still image cannot be imaged with the same angle of view as that in the first imaging mode, as shown in FIG. 7(D).

Accordingly, the digital still camera 1 can prevent the angle of view of the still picture to be imaged from differing between the first and second imaging mode, allowing the user to image the still picture without thinking about the difference in the still picture extraction range between the first and second imaging mode.

(1-3-3) Third Imaging Mode

The third imaging mode uses an aspect ratio of 16:9 for both still picture and HD moving picture, and is suitable for imaging a landscape and the like. In this mode, as shown in FIG. 5(C), both a still picture extraction range R30 and a moving picture extraction range R31 are set to a range with an aspect ratio of 16:9 into which the imaging range R11 is trimmed at the top and bottom, the horizontal longer side being aligned parallel to that of the imaging range R11.

That is, in the third imaging mode, both the still picture extraction range R30 and the moving picture extraction range R31 are set to the same range as the moving picture extraction range R12 of the first imaging mode (with an aspect ratio of 16:9).

When the aspect ratio of the still picture is set to 16:9, the digital still camera 1 displays a monitor picture Mp of the still picture extraction range R30 with an aspect ratio of 16:9 into which the imaging range R11 is trimmed at the top and bottom, on the display 6 with an aspect ratio of 4:3 for object confirmation, as shown in FIG. 8, for example. By doing so, in the third imaging mode, the digital still camera 1 allows the user to confirm an object to be imaged within the still picture extraction range R30 without thinking about trimming the top and bottom of the imaging range R11. Also, as the still picture extraction range R30 and the moving picture extraction range R31 are set to the same range, both the still picture and the HD moving picture can be imaged with an aspect ratio of 16:9 without any important part of the object being trimmed.

Thus, even if the aspect ratio is different between the still picture and the HD moving picture, the digital still camera 1 can extract the still picture and the HD moving picture from within the extraction range suitable for the object by automatically selecting an appropriate imaging mode from those three imaging modes. Note that the moving picture extraction range R12, R20, and R31 and the still picture extraction range R30 are the same range.

(1-4) Imaging Processing Procedure

Next, a processing procedure for the above-described digital still camera 1 to image a still picture and an HD moving picture in series (also referred to as "imaging processing procedure") is described with reference to a flowchart shown in FIG. 9. Note that this imaging processing procedure is performed according to a program read from the ROM 13 by the CPU 11 of the digital still camera 1.

When recognizing that the operation of switching to the imaging mode has been performed, the CPU 11 of the digital still camera 1 starts an imaging processing procedure RT1 to proceed to step SP1. In step SP1, the CPU 11 awaits the pressing down of the shutter button 5, and, when recognizing the pressing down, the CPU 11 proceeds to step SP2.

In step SP2, the CPU 11 determines whether or not an aspect ratio of 4:3 is selected as the aspect ratio of the still picture by the user. If YES in step SP2, meaning that the aspect ratio of the still picture is 4:3, the CPU 11 proceeds to step SP3.

In step SP3, the CPU 11 performs a face recognition processing, and, based on the result, determines whether or not the face of a person being imaged by the imaging device 17 at this time is positioned at the center of the picture. If NO in step SP3, meaning that the aspect ratio of the still picture is 4:3 and an object other than a person (e.g., a landscape) is to be imaged, the CPU 11 selects the first imaging mode and proceeds to step SP4.

In step SP4, the CPU 11 sets the still picture extraction range to the still picture extraction range R10 of the first imaging mode as shown in FIG. 5(A), and then proceeds to next step SP5. In step SP5, the CPU 11 extracts the still picture with an aspect ratio of 4:3 from within the still picture extraction range R10 to record it, and then proceeds to next step SP6.

In step SP6, the CPU 11 sets the moving picture extraction range to the moving picture extraction range R12 of the first imaging mode as shown in FIG. 5(A), and then proceeds to next step SP7. In step SP7, the CPU 11 starts extracting the HD moving picture with an aspect ratio of 16:9 from within the moving picture extraction range R12 and recording it. Then, when the moving picture imaging stop operation is performed or a preset time elapses, the CPU 11 stops extracting and recording the HD moving picture, and ends the imaging processing procedure RT1.

If YES in the above-described step SP3, meaning that the aspect ratio of the still picture is 4:3 and a person is to be imaged, the CPU 11 selects the second imaging mode and proceeds to step SP8.

In step SP8, the CPU 11 shortens the focal length to widen the angle of view of the imaging range R11 so that an important part of the object will not be included in the portion to be trimmed of the top and bottom of the imaging range R11, then sets the still picture extraction range to the still picture extraction range R21 of the second imaging mode as shown in FIG. 5(B), and then proceeds to next step SP9. In step SP9, the CPU 11 extracts the still picture with an aspect ratio of 4:3 from within the still picture extraction range R21 to record it, and then proceeds to next step SP10.

In step SP10, the CPU 11 sets the moving picture extraction range to the moving picture extraction range R20 of the second imaging mode as shown in FIG. 5(B), and then proceeds to next step SP11. In step SP11, the CPU 11 starts extracting the HD moving picture with an aspect ratio of 16:9 from within the moving picture extraction range R20 and recording it. Then, when the moving picture imaging stop operation is performed or a preset time elapses, the CPU 11 stops extracting and recording the HD moving picture, and ends the imaging processing procedure RT1.

If NO in the above-described step SP2, meaning that the aspect ratio of 16:9 rather than 4:3 is selected as the aspect ratio of the still picture, the CPU 11 selects the third imaging mode and proceeds to step SP12.

In step SP12, the CPU 11 sets the still picture extraction range to the still picture extraction range R30 of the third imaging mode as shown in FIG. 5(C), and then proceeds to next step SP13. In step SP13, the CPU 11 extracts the still picture with an aspect ratio of 16:9 from within the still picture extraction range R30 to record it, and then proceeds to next step SP6.

In step SP6, the CPU 11 sets the moving picture extraction range to the moving picture extraction range R31 that is the same as the moving picture extraction range R12 of the first imaging mode as shown in FIG. 5(C), and then proceeds to next step SP7. In step SP7, the CPU 11 starts extracting the HD moving picture with an aspect ratio of 16:9 from within the moving picture extraction range R31 and recording it. Then, when the moving picture imaging stop operation is performed or a preset time elapses, the CPU 11 stops extracting and recording the HD moving picture, and ends the imaging processing procedure RT1.

According to this imaging processing procedure RT1, the CPU 11 of the digital still camera 1 images the still picture and the HD moving picture in series.

(1-5) Reproducing Still Picture and Hd Moving Picture Associated with Each Other Next, reproducing a still picture and an HD moving picture associated with each other by a file name or a database constructed in the recording medium 27 is described in detail.

When reproducing a still picture with an aspect ratio of 4:3 and an HD moving picture with an aspect ratio of 16:9 that are imaged in the first imaging mode and associated with each other, the CPU 11 of the digital still camera 1, first, displays the still picture with an aspect ratio of 4:3 as it is, on the display 6 with an aspect ratio of 16:9 as shown in FIG. 10(A).

Then, when the CPU 11 of the digital still camera 1 recognizes that the moving picture reproducing operation has been performed by the user or recognizes that a certain period of time has elapsed, the CPU 11 displays, in place of the still picture, the HD moving picture with an aspect ratio of 16:9 associated with the still picture, on the display 6. In this case, the CPU 11 displays the HD moving picture without changing the horizontal angle of view so as to maintain the relation (i.e., ratio of size) between the still picture extraction range R10 and the moving picture extraction range R12 when imaging in the first imaging mode.

Thus, determining the size to be displayed of the still picture and the HD moving picture such that the relation between the still picture extraction range R10 and the moving picture extraction range R12 in imaging is maintained provides smooth switching from displaying the still picture to displaying the HD moving picture without causing the size of the object to abruptly change between the still picture and the HD moving picture.

Also, in this case, after switching to displaying the HD moving picture, the HD moving picture may be displayed enlarged fully using the screen of the display 6, according to a user setting (for example).

Also, when reproducing a still picture with an aspect ratio of 4:3 and an HD moving picture with an aspect ratio of 16:9 that are imaged in the second imaging mode and associated with each other, the CPU 11 of the digital still camera 1, first, displays the still picture with an aspect ratio of 4:3, on the display 6 with an aspect ratio of 16:9 as shown in FIG. 10(B). In this case, the still picture is displayed as it is on the display 6, as in the case of displaying the still picture imaged in the first imaging mode.

Then, when the CPU 11 of the digital still camera 1 recognizes that the moving picture reproducing operation has been performed by the user or recognizes that a certain period of time has elapsed, the CPU 11 displays, in place of the still picture, the HD moving picture with an aspect ratio of 16:9 associated with the still picture, on the display 6. In this case, the CPU 11 displays the HD moving picture fully using the screen of the display 6 without changing the vertical angle of view so as to maintain the relation (i.e., ratio of size) between the still picture extraction range R21 and the moving picture extraction range R20 when imaging in the second imaging mode.

Again, determining the size to be displayed of the still picture and the HD moving picture such that the relation between the still picture extraction range R21 and the moving picture extraction range R20 in imaging is maintained provides smooth switching from displaying the still picture to displaying the HD moving picture without causing the size of the object to abruptly change between the still picture and the HD moving picture. Also, in this case, the HD moving picture is displayed fully using the display 6, providing the impressive HD moving picture to the user.

Also, when reproducing a still picture with an aspect ratio of 16:9 and an HD moving picture with an aspect ratio of 16:9 that are imaged in the third imaging mode and associated with each other, the CPU 11 of the digital still camera 1, first, displays the still picture (not shown) with an aspect ratio of 16:9 fully using the display 6 with an aspect ratio of 16:9, then displays the HD moving picture (not shown) with an aspect ratio of 16:9 fully using the display 6.

Note that displaying a still picture and an HD moving picture on an external television monitor can be performed as in the case of displaying on the above-described display 6.

(1-6) Reproducing Processing Procedure

Next, a processing procedure for the above-described digital still camera 1 to reproduce a still picture and an HD moving picture (also referred to as "reproducing processing procedure") is described with reference to a flowchart shown in FIG. 11. Note that this reproducing processing procedure is performed according to a program read from the ROM 13 by the CPU 11 of the digital still camera 1.

When recognizing that the operation of switching to the reproducing mode has been performed by the user, the CPU 11 of the digital still camera 1 starts an reproducing processing procedure RT2 to proceed to step SP20. In step SP20, when recognizing that the still picture reproducing operation of reproducing a specified still picture has been performed using the operating unit 15, the CPU 11 selects a still picture data corresponding to the specified still picture in response to the operation to proceed to step SP21. Specifying the still picture can be performed using a method of displaying a thumbnail list of still pictures on the display 6 and selecting from them, a method of displaying still pictures sequentially on the display 6 and selecting from them, or the like.

In step SP21, the CPU 11 reads the selected still picture data from the recording medium 27 and proceeds to step SP22. In step SP22, the CPU 11 reproduces the read still picture data to display the still picture based on this still picture data on the display 6.

When the still picture is displayed on the display 6 in this way, the CPU 11 proceeds to step SP23 to start reading the HD moving picture data corresponding to the HD moving picture associated with the still picture being displayed, and then proceeds to step SP24. At this time, the CPU 11 reads the HD moving picture data by the amount that can be stored in, for example, the buffer memory 21 from the beginning of the data, and temporarily stores the read data to the buffer memory 21.

Thus the digital still camera 1 can switch from displaying the still picture to displaying the HD moving picture smoothly by starting reading the HD moving picture data while displaying the still picture.

In step SP24, when the CPU 11 recognizes that a certain period of time has elapsed since displaying the still picture, or recognizes that the moving picture reproducing operation has been performed by the user, the CPU 11 deletes the still picture being displayed on the display 6, and at the same time, reads the HD moving picture data from the buffer memory 21 and starts reproducing it to display the HD moving picture based on this HD moving picture data on the display 6.

When the reproducing of the HD moving picture data finishes, the CPU 11 ends the reproducing processing procedure RT2.

According to this reproducing processing procedure RT2, the CPU 11 of the digital still camera 1 reproduces the still picture and the HD moving picture.

(1-7) Operation and Advantages

In the above-described configuration, the digital still camera 1 images still and HD moving pictures having different aspect ratios by generating still picture data with an aspect ratio of 4:3 and HD moving picture data with an aspect ratio of 16:9 from picture data imaged by the imaging device 17 having the imaging range with an aspect ratio of 4:3 and recording them to the recording medium 27.

When imaging the still picture and the HD moving picture in this way, the digital still camera 1 determines whether or not an object being imaged by the imaging device 17 is a person.

If determined that the object is not a person, the digital still camera 1 selects as imaging mode the first imaging mode suitable for imaging a landscape. In this mode, the digital still camera 1 sets the still picture extraction range to the same range as the imaging range of the imaging device 17, and sets the moving picture extraction range to a range with an aspect ratio of 16:9 into which the still picture extraction range is trimmed at the top and bottom, the horizontal length being the same as that of the still picture extraction range, if the horizontal longer side is aligned parallel to that of the still picture extraction range.

Thus, when the object is not a person, it may be estimated that an important part of the object is rarely positioned in the top and bottom of the imaging range. Accordingly, even if the HD moving picture is extracted from within the moving picture extraction range into which the imaging range (still picture extraction range) is trimmed at the top and bottom, the HD moving picture with an aspect ratio of 16:9 can be imaged without the important part of the object being trimmed.

Also, in this case, the whole of the imaging range is used as the still picture extraction range, so the still picture with an aspect ratio of 4:3 and much higher definition than that of using only a portion of the imaging range can be imaged.

If determined that the object is a person, the digital still camera 1 selects as imaging mode the second imaging mode suitable for imaging a person. In this mode, when the shutter button 5 is pressed down, the digital still camera 1, first, widens the angle of view of the imaging range by zooming out so that the important part of the object will not be included in the top and bottom of the imaging range. Then, the digital still camera 1 sets the still picture extraction range to a range with an aspect ratio of 4:3 into which the imaging range of the imaging device 17 is trimmed at the top, bottom, and left and right edges, and sets the moving picture extraction range to a range with an aspect ratio of 16:9 into which the still picture extraction range is expanded at the left and right edges.

Thus, when the object is a person, the digital still camera 1 widens the angle of view of the imaging range R11 by zooming out so that the important part of the object will not be included in the portion to be trimmed of the top and bottom of the imaging range R11, then extracts the still picture from within the still picture extraction range into which the imaging range is trimmed at the top, bottom, and left and right edges, and then extracts the HD moving picture from within the moving picture extraction range into which this still picture extraction range is expanded at the left and right edges. By doing so, even if the object (person) is imaged fully using the imaging range (that is, fully using a monitor picture displayed on the display 6), the HD moving picture with an aspect ratio of 16:9 can be imaged without the important part of the object (person) being trimmed.

According to the above-described configuration, the digital still camera 1, according to the selected imaging mode, sets the still picture extraction range with an aspect ratio of 4:3 for extracting a still picture and the moving picture extraction range with an aspect ratio of 16:9 for extracting an HD moving picture within the imaging range of the imaging device 17. Then, the digital still camera 1, from the imaged picture, extracts a picture within the set still picture extraction range as still picture, and extracts a picture within the set moving picture extraction range as HD moving picture. That is, the digital still camera 1 can switch between the still picture extraction range and the HD moving picture extraction range having different aspect ratios according to the imaging mode. And thus, from the picture within the imaging range (i.e., the original picture), the digital still camera 1 can extract the still picture and the HD moving picture having different aspect ratios from within the extraction range suitable for the imaging mode.

(2) Second Embodiment

Next, a second embodiment is described. In the second embodiment, the digital still camera 1 has only the first and second imaging modes, and the selection from the first and second imaging modes can be performed manually by the user in addition to being performed automatically. Also, in the second embodiment, when the imaging mode is manually selected, the digital still camera 1 displays a monitor picture according to the selected imaging mode on the display 6.

An imaging processing procedure in which the first and second imaging modes can be selected both automatically and manually is described below with reference to a flowchart shown in FIG. 12. Note that the configuration of the digital still camera 1 is similar to that of the first embodiment.

When recognizing that the operation of switching to the imaging mode has been performed, the CPU 11 of the digital still camera 1 starts an imaging processing procedure RT3 to proceed to step SP100. In step SP100, the CPU 11 determines whether or not the first imaging mode is selected manually by the user.

If YES in step SP100, meaning that the first imaging mode is selected manually by the user, the CPU 11 proceeds to step SP101. In step SP101, the CPU 11 displays a monitor picture according to the first imaging mode on the display 6.

At this time, the CPU 11 displays a picture within the still picture extraction range R10 with an aspect ratio of 4:3 of the first imaging mode (i.e., the imaging range R11 of the imaging device 17) as monitor picture Mp fully using the display 6 with an aspect ratio of 4:3, as shown in FIG. 13(A), for example. Also, the CPU 11 superimposes onto this monitor picture Mp an auxiliary line L1 indicating the frame of the moving picture extraction range R12 with an aspect ratio of 16:9 into which the still picture extraction range R10 is trimmed at the top and bottom.

By doing so, in the first imaging mode, the CPU 11 can visually indicate to the user what portion of a monitor picture Mp displayed on the display 6 is the still picture extraction range and what portion is the HD moving picture extraction range.

After thus displaying the monitor picture Mp on the display 6, the CPU 11 proceeds to step SP102. In step SP102, the CPU 11 awaits the pressing down of the shutter button 5, and, when recognizing the pressing down, the CPU 11 proceeds to step SP103.

In step SP103, the CPU 11 performs a processing similar to the processing of steps SP4 to SP7 of the imaging processing procedure RT1 (FIG. 9) of the first embodiment to extract and record the still picture and the HD moving picture in the first imaging mode and then ends the imaging processing procedure RT2.

On the other hand, if NO in the above-described step SP100, the CPU proceeds to step SP104. In step SP104, the CPU 11 determines whether or not the second imaging mode is selected manually by the user.

If YES in step SP104, meaning that the second imaging mode is selected manually by the user, the CPU 11 proceeds to step SP105. In step SP105, the CPU 11 zooms out with the camera block 16 to match the angle of view of the still picture extraction range R21 of the second imaging mode to the angle of view of the still picture extraction range R10 of the first imaging mode, and then proceeds to next step 106.

In step SP106, the CPU 11 displays a monitor picture according to the second imaging mode on the display 6.

At this time, the CPU 11 displays a picture within the moving picture extraction range R20 with an aspect ratio of 16:9 of the second imaging mode (i.e., the range into which the imaging range R11 of the imaging device 17 is trimmed at the top and bottom) as monitor picture Mp on the display 6 with an aspect ratio of 4:3, as shown in FIG. 13(B), for example. Also, the CPU 11 superimposes onto this monitor picture Mp an auxiliary line L2 indicating the frame of the still picture extraction range R21 with an aspect ratio of 4:3 into which the moving picture extraction range R20 is trimmed at the left and right edges.

By doing so, in the second imaging mode, the CPU 11 can visually indicate to the user what portion of a monitor picture Mp displayed on the display 6 is the still picture extraction range and what portion is the HD moving picture extraction range.

After thus displaying the monitor picture Mp on the display 6, the CPU 11 proceeds to step SP107. In step SP107, the CPU 11 awaits the pressing down of the shutter button 5, and, when recognizing the pressing down, the CPU 11 proceeds to step SP108.

In step SP108, the CPU 11 performs a processing similar to the processing of steps SP8 to SP11 of the imaging processing procedure RT1 (FIG. 9) of the first embodiment (except the zooming out, which has been already performed) to extract and record the still picture and the HD moving picture in the second imaging mode and then ends the imaging processing procedure RT2.

On the other hand, if NO in the above-described step SP104, meaning that the imaging mode is selected automatically, the CPU 11 proceeds to step SP109. In step SP109, the CPU 11 sets the imaging mode to be automatically selected, and proceeds to next step SP110.

In step SP110, the CPU 11 displays a monitor picture Mp according to the first imaging mode on the display 6 (FIG. 13(A)), and proceeds to next step SP111.

In step SP111, the CPU 11 awaits the pressing down of the shutter button 5, and, when recognizing the pressing down, the CPU 11 proceeds to step SP112.

In step SP112, the CPU 11 performs the face recognition processing, and, based on the result, determines whether or not the face of a person being imaged by the imaging device 17 at this time is positioned at the center of the picture (that is, whether or not the second imaging mode is automatically selected). If NO in step SP112, meaning that the first imaging mode is automatically selected because an object other than a person (e.g., a landscape) is to be imaged, the CPU 11 selects the first imaging mode and proceeds to step SP103.

In step SP103, the CPU 11 extracts and records the still picture and the HD moving picture in the first imaging mode and then ends the imaging processing procedure RT2.

On the other hand, if YES in step SP112, meaning that the second imaging mode is automatically selected because a person is to be imaged, the CPU 11 selects the second imaging mode and proceeds to step SP113.

In step SP113, the CPU 11 zooms out with the camera block 16 to match the angle of view of the still picture extraction range R21 of the second imaging mode to the angle of view of the still picture extraction range R10 of the first imaging mode, and then proceeds to next step 108.

In step SP108, the CPU 11 extracts and records the still picture and the HD moving picture in the second imaging mode and then ends the imaging processing procedure RT2.

According to this imaging processing procedure RT2, the CPU 11 of the digital still camera 1 images the still picture and the HD moving picture in series.

(3) Other Embodiments

In the first embodiment described above, the aspect ratio of the imaging device 17 is fixed to 4:3, the aspect ratio of the still picture is fixed to 4:3 or 16:9, and the aspect ratio of the HD moving picture is fixed to 16:9. However, in the invention, the aspect ratio is not limited to these, and any other various aspect ratios may be applied to the imaging device 17, the still picture, and the HD moving picture.

For example, the aspect ratio of the still picture may be the same as or horizontally longer than the aspect ratio of the imaging device 17, and the aspect ratio of the HD moving picture may also be the same as or horizontally longer than the aspect ratio of the imaging device 17.

Also, in the first embodiment described above, the first, second or third imaging mode is automatically selected. However, the invention is not limited to this, and the user may be allowed to manually select the imaging mode regardless of whether the object is a person or not. Also, the user may be allowed to freely set the combination of aspect ratio and imaging range, in addition to selecting the imaging mode.

For example, in place of steps SP2 and SP3 of the imaging processing procedure RT1 shown in FIG. 9, a step of determining which imaging mode is selected by the user may be provided. In this step, if determined that the first imaging mode is selected, a processing according to the first imaging mode (steps SP4 to SP7) is performed; if determined that the second imaging mode is selected, a processing according to the second imaging mode (steps SP8 to SP11) is performed;

or if determined that the third imaging mode is selected, a processing according to the third imaging mode (steps SP12 to SP13) is performed.

Also, in the first and second embodiment described above, when the still picture and the HD moving picture are imaged at a time, the still picture is imaged first, and then the HD moving picture is imaged. However, the invention is not limited to this, and the HD moving picture may be imaged before the still picture is imaged.

Also, in the first and second embodiments described above, the face recognition is used as a method for determining whether the object is a person or not. However, the invention is not limited to this, and, for example, whether the object is a person or not may be determined based on the imaging mode selected by the user.

Specifically, for example, the digital still camera 1 may have a person imaging mode suitable for imaging a person and a landscape imaging mode suitable for imaging a landscape, in which, when the person imaging mode is selected by the user, it is determined that the object is a person. In this case, for example, the first and second imaging modes described above may be the landscape imaging mode and the person imaging mode, respectively, from which the user can select.

This allows the digital still camera 1 to determine whether the object is a person or not, based on the selected imaging mode without the face recognition function.

Also, whether the object is a person or not may be determined based on the distance to the object. For example, when the camera block 16 of the digital still camera 1 has a focus adjustment function, if the distance to the object in focus obtained from the camera block 16 is equal to or less than a predetermined value (for example, 5 m), the object may be determined to be a person.

Also, in this case, what is essential is that an object (not limited to a person, but like a person) that important parts thereof are positioned at not only the center but also the top and bottom of the imaging range can be determined. Determining such an object and selecting the first or second imaging mode described above allows the still picture and the HD moving picture to be imaged without an important part of the object being trimmed.

Also, when all of the face recognition, selected imaging mode, and distance to the object that have been described are obtained, and the object is determined to be a person from at least one of these, the object may be concluded to be a person.

Also, in the first embodiment described above, in the imaging processing procedure RT1, after the shutter button 5 is pressed down, whether the object is a person or not are determined, and the still picture extraction range and the moving picture extraction range are set. However, the invention is not limited to this, and, before the shutter button 5 is pressed down, whether the object is a person or not may be determined at predetermined intervals (for example, every several milliseconds) to reset the still picture extraction range and the moving picture extraction range at predetermined intervals. In this case, the still picture and the HD moving picture may be extracted from within the still picture extraction range and the moving picture extraction range at the time the shutter button 5 is pressed down.

Also, in this case, a picture within the still picture extraction range reset at predetermined intervals may be displayed as monitor picture on the display 6. This allows the user to confirm the still picture extraction range at this time and press down the shutter button 5.

Also, in the first and second embodiments described above, the angle of view of the still picture extraction range R21 of the second imaging mode is matched to the angle of view of the still picture extraction range R10 of the first imaging mode by shortening the focal length (i.e., optically zooming out). However, the invention is not limited to this, and the effect similar to the optical zooming out may be obtained by electrically scaling down the picture within the still picture extraction range R21 of the second imaging mode.

If the digital still camera 1 cannot zoom out to match the angle of view of the still picture extraction range R21 of the second imaging mode to the angle of view of the still picture extraction range R10 of the first imaging mode due to the limitation of the zooming mechanism of the camera block 16, the digital still camera 1 may inform the user of this by displaying on the display 6 the textual information indicating that the angle of view cannot be matched.

Also, in the first and second embodiments described above, the recording medium 27 to be inserted into the memory slot 8 is used as a device to which the still picture data and the HD moving picture data are recorded. However, the invention is not limited to this, and the recording medium 27 may be a hard disk or flash memory fixed to the digital still camera 1.

Also, in the first and second embodiments described above, the moving picture to be imaged is the HD moving picture. However, the invention is not limited to this, and a standard definition (SD) moving picture with a resolution lower than the HD moving picture or another moving picture may be imaged.

Also, in the first and second embodiments described above, the operating unit 15 including the shutter button 5 and the operation buttons 7 is provided in the digital still camera 1. However, the invention is not limited to this, and, for example, the display 6 having a touch panel may be provided to allow the operation on the operating unit 15 to be performed on the touch panel. Accordingly, the operating unit 15 including other various operating devices in addition to the shutter button 5 and the operation buttons 7 may be provided. In addition, a receiver for receiving a signal from a remote device (e.g., remote controller) may be provided in the digital still camera 1 to allow the operation of the digital still camera 1 to be controlled from the remote device.

Also, in the first and second embodiments described above, the invention is applied to the digital still camera 1. However, the invention is not limited to this, and the invention may be applied to a digital video camera or a mobile phone having camera function, as long as they have functions similar to those of the above-described digital still camera 1.

Also, in the first and second embodiments described above, the CPU 11 of the digital still camera 1 performs the above-described imaging processing according to the program previously recorded in the ROM 13. However, the invention is not limited to this, and the program for performing the imaging processing may be recorded to a recording medium such as optical disk or memory card, and installed to, for example, the recording medium 27 of the digital still camera 1 by reading the program recorded in the recording medium using a personal computer externally connected with the digital still camera 1 and transferring the program to the digital still camera 1.

Also, in the first and second embodiments described above, the digital still camera 1 as an imaging apparatus includes: the camera block 16 as an imaging unit; the picture scaling/trimming block 22 and the HD moving picture codec/recording/reproducing block as an image processing unit; the CPU 11 as an imaging mode selection unit, an angle of view control unit, an extraction range setting unit, and an object determination unit; and the display controller 24 as a display processing unit. However, the invention is not limited to this, and any other type of imaging unit, image processing unit, extraction range setting unit, object determination unit, and display processing unit may be included in the imaging apparatus, as long as they have functions similar to those of the above-described digital still camera 1.

For example, a device for determining an object may be separately provided, or the CPU 11 may perform the display processing.

INDUSTRIAL APPLICABILITY

The invention can be applied to an imaging apparatus capable of imaging still and moving pictures, such as a digital still camera and a digital video camera.

DESCRIPTION OF REFERENCE NUMERALS

1:DIGITAL STILL CAMERA, 3:CAMERA LENS UNIT, 4:MICROPHONE, 5:SHUTTER BUTTON, 6:DISPLAY, 11:CPU, 15:OPERATIING UNIT, 16:CAMERA BLOCK, COMPRESSION/DECOMPRESSION BLOCK, 27:RECORDING MEDIUM, 28:HD MOVING PICTURE CODEC/RECORDING/REPRODUCING BLOCK, Mp:MONITOR PICTURE, R10,R21,R30:STILL PICTURE EXTRACTION RANGE,R11:IMAGING RANGE, R12, R20,R31:MOVING PICTURE EXTRACTION RANGE

The invention claimed is:

1. An imaging apparatus comprising:
an imaging unit for imaging an object and outputting a picture within an imaging range;
an extraction range setting unit for setting a still picture extraction range with a first aspect ratio within the imaging range and a moving picture extraction range with a second aspect ratio different from the first aspect ratio within the imaging range for each imaging mode, and when the imaging mode is a person imaging mode, in order to give the moving picture extraction range the second aspect ratio, sets the moving picture extraction range to a range into which the imaging range is cropped at the top and bottom, and, in order to give the still picture extraction range the first aspect ratio, sets the still picture extraction range to a range into which the imaging range is cropped at the top and bottom so that the top and bottom edges of the still picture extraction range will be matched to those of the moving picture extraction range and also to a range into which the imaging range is cropped at the left and right edges; and
an image processing unit for extracting from the picture within the imaging range a picture within the still picture extraction range set by the extraction range setting unit as a still picture, and extracting from the picture within the imaging range a picture within the moving picture extraction range set by the extraction range setting unit as a moving picture,
wherein the imaging range has the first aspect ratio, and wherein the second aspect ratio is horizontally longer than the first aspect ratio.

2. The imaging apparatus according to claim 1,
wherein the extraction range setting unit,
in any imaging mode other than the person imaging mode, sets the still picture extraction range to the imaging range, and, in order to give the moving picture extraction range the second aspect ratio, sets the moving picture extraction range to a range into which the imaging range is cropped at the top and bottom.

3. The imaging apparatus according to claim 2,
further comprising an angle of view control unit for controlling an angle of view of the imaging range of the imaging unit;
wherein the angle of view control unit,
in the person imaging mode, controls the angle of view of the imaging range of the imaging unit so that the angle of view of the still picture extraction range in the person imaging mode will be matched to the angle of view of the still picture extraction range in any imaging mode other than the person imaging mode.

4. The imaging apparatus according to claim 1, further comprising:
an object determination unit for determining whether the object is a person or not, based on the picture; and
an imaging mode selection unit for selecting the person imaging mode if the object is determined to be a person by the object determination unit.

5. The imaging apparatus according to claim 1,
further comprising a display processing unit for displaying the still picture and the moving picture extracted by the image processing unit on a display;
wherein the display processing unit
displays the still picture and the moving picture on the display, each with a size corresponding to the ratio of size between the still picture extraction range and the moving picture extraction range.

6. An imaging method comprising:
setting a still picture extraction range with a first aspect ratio within an imaging range from within which a picture is output from an imaged picture and a moving picture extraction range with a second aspect ratio different from the first aspect ratio within the imaging range for each imaging mode;
extracting from the picture within the imaging range a picture within the still picture extraction range set by the extraction range setting unit as a still picture;
setting, when the imaging mode is a person imaging mode, in order to give the moving picture extraction range the second aspect ratio, the moving picture extraction range to a range into which the imaging range is cropped at the top and bottom, and, in order to give the still picture extraction range the first aspect ratio, sets the still picture extraction range to a range into which the imaging range is cropped at the top and bottom so that the top and bottom edges of the still picture extraction range will be matched to those of the moving picture extraction range and also to a range into which the imaging range is cropped at the left and right edges; and
extracting from the picture within the imaging range a picture within the moving picture extraction range set by the extraction range setting unit as a moving picture.

* * * * *